US005592684A

United States Patent [19]
Gaskins et al.

[11] Patent Number: 5,592,684
[45] Date of Patent: Jan. 7, 1997

[54] STORE QUEUE INCLUDING A BYTE ORDER TRACKING MECHANISM FOR MAINTAINING DATA COHERENCY

[75] Inventors: Darius D. Gaskins, Austin; Terry J. Parks, Round Rock, both of Tex.

[73] Assignee: Dell USA, L.P., Austin, Tex.

[21] Appl. No.: 279,758

[22] Filed: Jul. 22, 1994

[51] Int. Cl.⁶ .......................... G06F 13/14; G06F 13/38
[52] U.S. Cl. .................. 395/872; 395/308; 395/849; 395/853; 395/821; 395/309
[58] Field of Search ............................. 395/308, 859, 395/872, 292, 481, 849, 853, 874, 309, 310

[56] References Cited

U.S. PATENT DOCUMENTS

| | | | |
|---|---|---|---|
| 4,285,038 | 8/1981 | Suzuki et al. | 395/877 |
| 4,750,154 | 6/1988 | Lefsky et al. | 395/435 |
| 4,935,894 | 6/1990 | Ternes et al. | 395/309 |
| 5,034,914 | 7/1991 | Osterlund | 395/872 |
| 5,131,081 | 7/1992 | MacKenna et al. | 395/842 |
| 5,276,849 | 1/1994 | Patel | 395/468 |
| 5,293,381 | 3/1994 | Choy | 370/99 |
| 5,357,622 | 10/1994 | Parks et al. | 395/444 |
| 5,359,611 | 10/1994 | Parks et al. | 371/404 |
| 5,459,842 | 10/1995 | Begun et al. | 395/250 |

Primary Examiner—Jack B. Harvey
Assistant Examiner—Jigar Pancholi
Attorney, Agent, or Firm—Henry N. Garrana; Mark P. Kahler; Michelle M. Turner

[57] ABSTRACT

A store queue is provided that forms an interface between a primary bus and a secondary bus and which temporarily stores data to be written via a memory or I/O channel to a peripheral device. The store queue allows partial writes executed on the primary bus to be combined within a common word storage cell of an internal FIFO buffer regardless of whether the consecutive partial writes result in an invalid byte combination. If the data being transferred does not constitute an invalid byte combination, the store queue executes a single write cycle on the secondary bus. If the data contained by the word memory cell constitutes an invalid byte combination, the store queue executes two or more partial writes on the secondary bus to transfer the data in the order it was received. The store queue includes a byte order tracking circuit, such as an accumulation counter, for tracking the order in which the bytes are written from the primary bus. The store queue may further include a configuration register that stores a descriptor that identifies certain address regions as order-protected. If the data stored within a particular memory cell of the store queue corresponds to an address within the protective range, the store queue transfers the data on the secondary bus in the same order as it was received from the primary bus.

21 Claims, 8 Drawing Sheets

STORE QUEUE INCLUDING A BYTE ORDER TRACKING MECHANISM FOR MAINTAINING DATA COHERENCY

BACKGROUND OF THE INVENTION

1. Field of the Invention

This invention relates to computer systems and more particularly to store queues that provide temporary storage areas between a processor and a memory or I/O channel. The invention further relates to mechanisms for maintaining data coherency within computer systems.

2. Description of the Relevant Art

A store queue is a temporary data storage mechanism interposed between a processor and a memory or I/O channel. The store queue essentially decouples the processor from the memory or I/O channel by allowing the processor to write data directly into the store queue. Once the processor has completed its write operation, the processor is free to perform other tasks. The store queue itself is responsible for transferring the write data to the designated device of the memory or I/O channel. By decoupling the processor from the memory or I/O channel, adverse effects as a result of a possibly long write latency associated with the device being written may be reduced.

Both memory and I/O channels include a data bus through which data may be transferred to and from the processor. The width of the data bus is the word size of the memory or I/O channel. Within modern computer systems, a typical word size is 32-bits. Each word transferred on the memory or I/O channel has an associated address which indicates where the word is stored or to which I/O device the word is to be transferred.

Many microprocessors including the particularly popular models 80486 and Pentium processors do not always write data having the same word size as the memory or I/O channel through which the data is transferred. For example, a processor may write 8-bit data or 16-bit data during a particular cycle, even though the memory or I/O channel through which the data is written has a width of 32-bits. This type of write operation is referred to as a partial write in that the data being transferred has a smaller bit width than the bit width of the memory or I/O channel. To maintain data coherency and effectuate proper data transfers during such situations, a set of byte enable signals associated with each addressed word are set to indicate the particular bytes being written. Partial writes often occur in a regular increasing or decreasing sequence with respect to the bytes of an addressed word being transferred (i.e., the lower order byte of a designated word may be written first, followed sequentially by the second order byte, then by the third order byte, and so on).

A store queue may also enhance system performance by combining multiple partial writes of the same word address into a single write to the memory or I/O channel. A store queue which implements a technique for combining partial writes is described within U.S. Pat. No. 4,750,154 to Lefsky, et al.

Figure 1A:
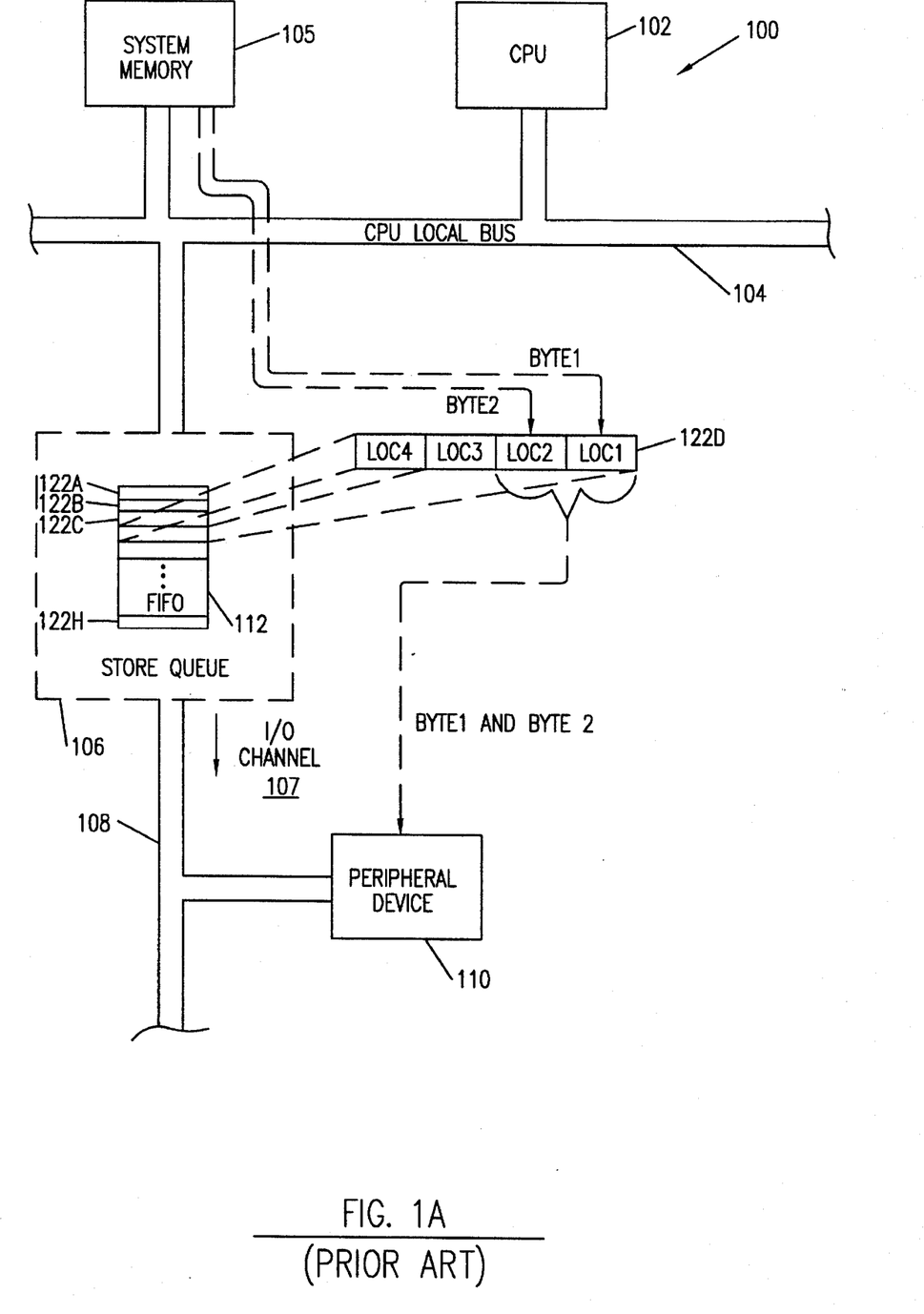
FIG. 1A is a block diagram of a typical computer system including a store queue capable of combining multiple partial writes into a single write cycle on a secondary bus.
Figure 1B:
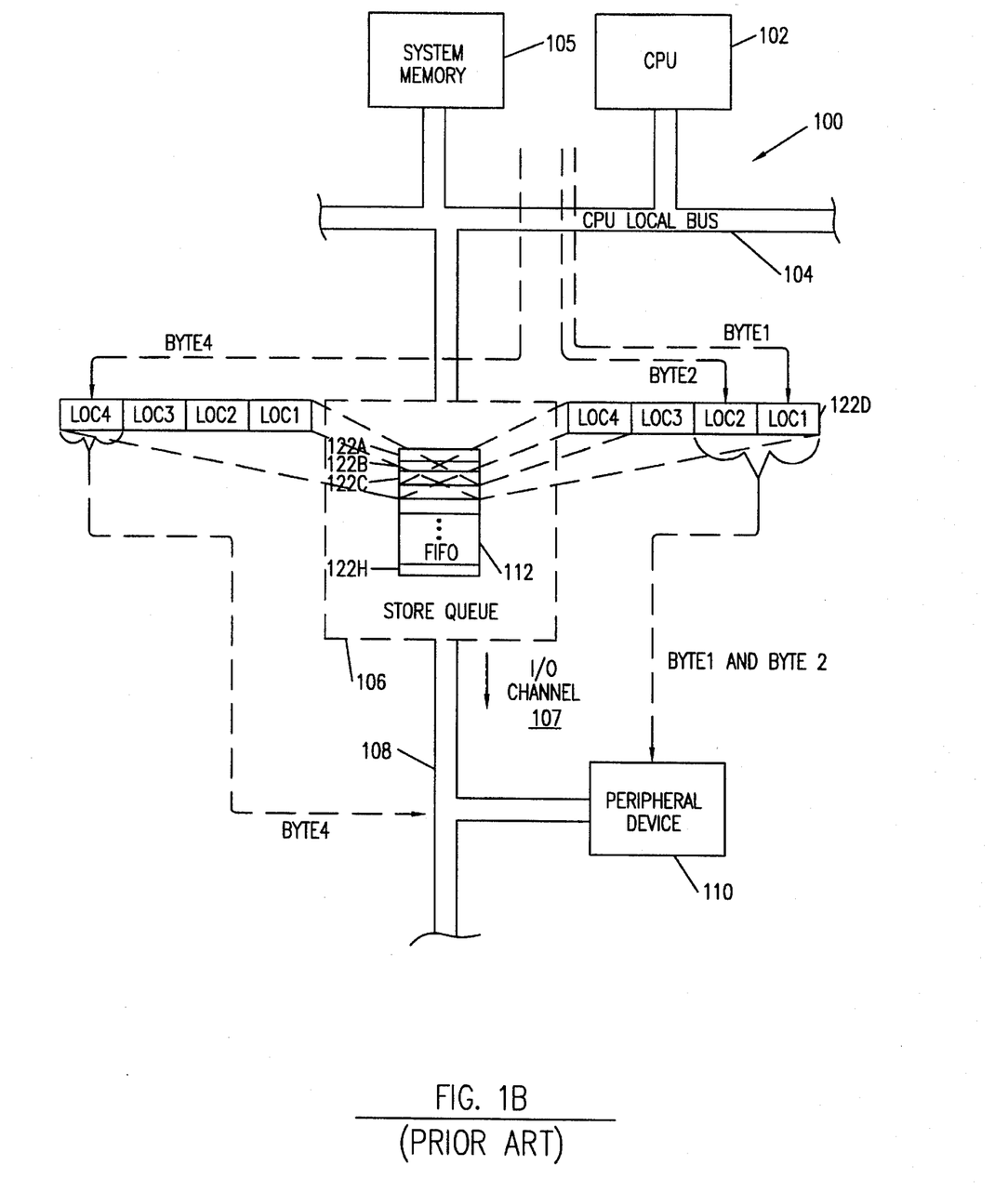
FIG. 1B is a block diagram of a typical computer system which illustrates the temporary storage of data within the store queue when a non-contiguous combination of partial writes occur.

FIGS. 1A and 1B are provided to more clearly illustrate the operation of an exemplary store queue which combines multiple partial writes of a processor into a single write to an I/O channel. FIGS. 1A and 1B are further provided to illustrate several problems and limitations which may be associated with such a store queue.

Referring first to FIG. 1A, a block diagram is shown of a typical computer system 100 including a central processing unit (CPU) 102 coupled via a CPU local bus 104 to a system memory 105 and to a store queue 106. In its illustrated form, store queue 106 provides an interface between CPU local bus 104 and an I/O channel 107 formed in part by a secondary bus 108. An I/O peripheral device 110 is finally shown coupled to secondary bus 108.

For the system of FIG. 1A, CPU local bus 104 as well as secondary bus 108 each include a data bus having a width of 32-bits. Peripheral device 110 is a 32-bit peripheral, and is illustrative of, for example, a disk drive, a printer, or a local area network (PLAN) device, among other things.

Store queue 106 is provided for receiving write data from CPU local bus 104 and for temporarily storing the data until it can be transferred through I/O channel 107 to peripheral device 110 via secondary bus 108. Store queue 106 includes a FIFO (first-in first-out) buffer 112 that temporarily stores the data. FIFO buffer 112 is arranged with a plurality of separately addressable word storage cells 122A–122H, wherein each word storage cell is capable of storing a word of data. For the system of FIG. 1, each word consists of four 8-bit bytes. When microprocessor 102 executes a write cycle to transfer a full word of data (i.e., 32 bits) to peripheral device 110, the word is temporarily stored within one of the word storage cells 122A–122H of FIFO buffer 112 and is, in turn, passed on to peripheral device 110 via I/O channel 107. Store queue 106 thereby allows the microprocessor 102 to quickly execute (and be released from) a write cycle without being negatively impacted by a possibly large write latency which may be associated with peripheral device 110.

Store queue 106 is additionally configured to combine certain multiple partial write cycles of CPU local bus 104 into a single write cycle on secondary bus 108. This is best understood from the following example. Consider the illustrated situation in which microprocessor 102 executes a first partial write cycle to write a first 8-bit byte of data labeled Byte1 to peripheral device 110. For this example, the byte enable signals indicate that this data corresponds to the lower order byte of the addressed word. Thus, when the write cycle is initiated by microprocessor 102, the byte of data Byte1 is stored within a designated one of the word storage cells 122A–122H, such as word storage cell 122D. Since the byte enable signals indicate this is the lower byte of the addressed word, the byte is stored within a lower order byte location Loc1 of word memory cell 122D. If microprocessor 102 thereafter executes another write cycle to write a byte of data Byte2 to the second order byte location of the same word address, this second byte of data is stored within a second byte location Loc2 of word storage cell 122D. Assuming that another sequential write to this word address is not executed by microprocessor 102 (i.e., microprocessor 102 could additionally write a third and a fourth byte of data to byte locations Loc3 and Loc4, respectively, of memory cell 122D), store queue 106 thereafter transfers both Byte1 and Byte2 to peripheral device 110 during a single write cycle on secondary bus 108. By combining the write operations, the overall bandwidth of secondary bus 108 may be increased and the transfer of data into peripheral device 110 may be expedited.

Despite the mentioned advantages, the store queue 106 described with reference to FIG. 1A may be associated with certain data coherency problems or may be associated with certain limitations in performance, as will be described below. First, the combining of several partial writes into a single write to peripheral device 110 may result in a data coherency problem if proper processing of the data by peripheral device 110 is in fact dependent upon the order of data written from microprocessor 102 on a per-byte basis.

By combining the partial writes into a single write, the data is no longer ordered with respect to each byte. Thus, such byte order dependencies by peripheral device 110 must be strictly prohibited to avoid data incoherencies. This limits system flexibility.

The performance of store queue 106 may be further limited when consecutive partial writes are executed which would result in an invalid byte enable combination if the partial writes were combined. In systems such as model 80486 based systems, an invalid byte combination is defined as a non-contiguous combination of enabled bytes within a given addressed word. The transfer of data having an invalid byte combination on CPU local bus 104 or secondary bus 108 is prohibited by system definition. Thus, to avoid such an invalid transfer, when a pair of partial writes are consecutively received by store queue 106 that would result in an invalid byte enable combination if combined, the store queue 106 inhibits the combined storage of the invalid byte combination within a common word storage cell 122A–122H and instead stores the bytes within separate word storage cells. Store queue 106 thereafter causes the bytes to be written via separate cycles on secondary bus 108. This concept will be better understood with reference to FIG. 1B.

FIG. 1B illustrates a situation in which microprocessor 102 first executes a partial write cycle that causes Byte1 to be stored within byte location Loc1 of word storage cell 122D and then executes a second partial write cycle that causes Byte2 to be stored within byte location Loc2. It is noted that store queue 106 allows Byte1 and Byte2 to be stored within a common word storage cell since the two bytes are contiguous with respect to that word. If microprocessor 102 thereafter executes a partial write cycle to write a non-contiguous byte of data Byte4 which is associated with the highest order byte of the addressed word, store queue 106 detects the non-continuity and therefore identifies it as an invalid combination. Thus, store queue 106 stores Byte4 within the next word storage cell 122E of FIFO buffer 112, and executes a separate write cycle on bus 108 to transfer Byte4 to peripheral device 110. Unfortunately, this decreases the effective length of the store queue and decreases system performance since multiple partial write cycles must be executed on bus 108.

SUMMARY OF THE INVENTION

The problems outlined above are in large part solved by a store queue including a byte order tracking mechanism according to the present invention. In one embodiment, a store queue is provided that provides an interface between a primary bus such as a CPU local bus and a secondary bus. The secondary bus forms a memory or I/O channel to a peripheral device. The store queue allows partial writes executed on the primary bus to be combined within a common word storage cell of an internal FIFO buffer regardless of whether the consecutive partial writes result in an invalid byte combination. When the data is ready for transfer to the peripheral device, if the data being transferred does not constitute an invalid byte combination, the store queue executes a single write cycle on the secondary bus. On the other hand, if the data contained by the word memory cell constitutes an invalid byte combination, the store queue executes two or more partial writes on the secondary bus to transfer the data in the order it was received. The store queue includes a byte order tracking circuit, such as an accumulation counter, for tracking the order in which the bytes are written from the primary bus. As a result, the effective length of the store queue is increased and the bandwidth of the secondary bus may be enhanced.

The store queue may further include a configuration register that stores a descriptor that identifies certain address regions as order-protected. Thus, if the data stored within a particular memory cell of the store queue corresponds to an address within the protective range, the store queue transfers the data on the secondary bus in the same order as it was received from the primary bus. As a result, data coherency problems are avoided for situations in which proper processing of the data by the peripheral device is dependent upon the order of the bytes written from the primary bus.

Broadly speaking, the present invention contemplates a store queue for temporarily storing data to be transferred from a primary bus to a secondary bus. The store queue comprises a storage unit including a plurality of word storage cells, wherein one of the word storage cells is capable of receiving a first byte of data in response to a first partial write cycle on the primary bus. The storage queue further comprises a primary bus interface unit coupled to the storage unit and the primary bus, wherein the primary bus interface unit is capable of determining whether a subsequent partial write cycle on the primary bus corresponds to a word address of the first partial write cycle is capable of causing a merging of a second byte of data associated with the subsequent partial write cycle into one of the word storage cells if the subsequent partial write cycle corresponds to the word address of the first partial write cycle. The store queue also comprises a byte order tracking circuit coupled to the storage unit and capable of tracking the order in which the first byte is written with respect to the second byte and a secondary bus interface unit coupled to the storage unit and capable of transferring the first and second bytes of data from one of the word storage cells of the storage unit during separate partial write cycles on the secondary bus.

The present invention further contemplates a store queue comprising a RAM buffer unit including a plurality of word storage cells, wherein one of the word storage cells is capable of receiving a first byte of data in response to a first partial write cycle on the primary bus. The store queue further comprises a primary bus interface unit coupled to the storage unit and the primary bus, wherein the primary bus interface unit is capable of determining whether a subsequent partial write cycle on the primary bus corresponds to a word address of the first partial write cycle and is capable of causing a merging of a second byte of data associated with the subsequent partial write cycle into one of the word storage cells if the subsequent partial write cycle corresponds to the word address. The primary bus interface unit is further capable of causing a second byte of data to be stored in a separate word storage cell if a word address of the subsequent partial write cycle is not equal to the word address of the first partial write cycle. The store queue also comprises an accumulation counter coupled to the storage unit and capable of generating a count value indicative of the order in which the first byte was written relative to the second byte if the word address of the first partial write cycle equals the word address of the subsequent partial write cycle and a secondary bus interface unit coupled to the storage unit and capable of transferring the first and second bytes of data from one of the word storage cells of the storage unit during separate partial write cycles on the secondary bus in the order indicated by the count value.

The present invention finally contemplates a method for operating a store queue which provides an interface between a primary bus and a secondary bus. The method comprises the steps of receiving a first byte of data in response to a first partial write cycle on the primary bus, receiving a second byte of data in response to a subsequent partial write cycle on the primary bus, and storing the first byte and the second byte of data within a common word storage cell. The method comprises the further steps of tracking an order in which the first byte was received relative to the second byte, determining whether the first byte and the second byte of data within the word storage cell constitutes an invalid byte combination, and transferring the first and second bytes of data during a single write cycle on the secondary bus if a valid byte combination exists and transferring the first byte and the second byte of data during separate partial write cycles on the secondary bus if an invalid byte combination exists.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
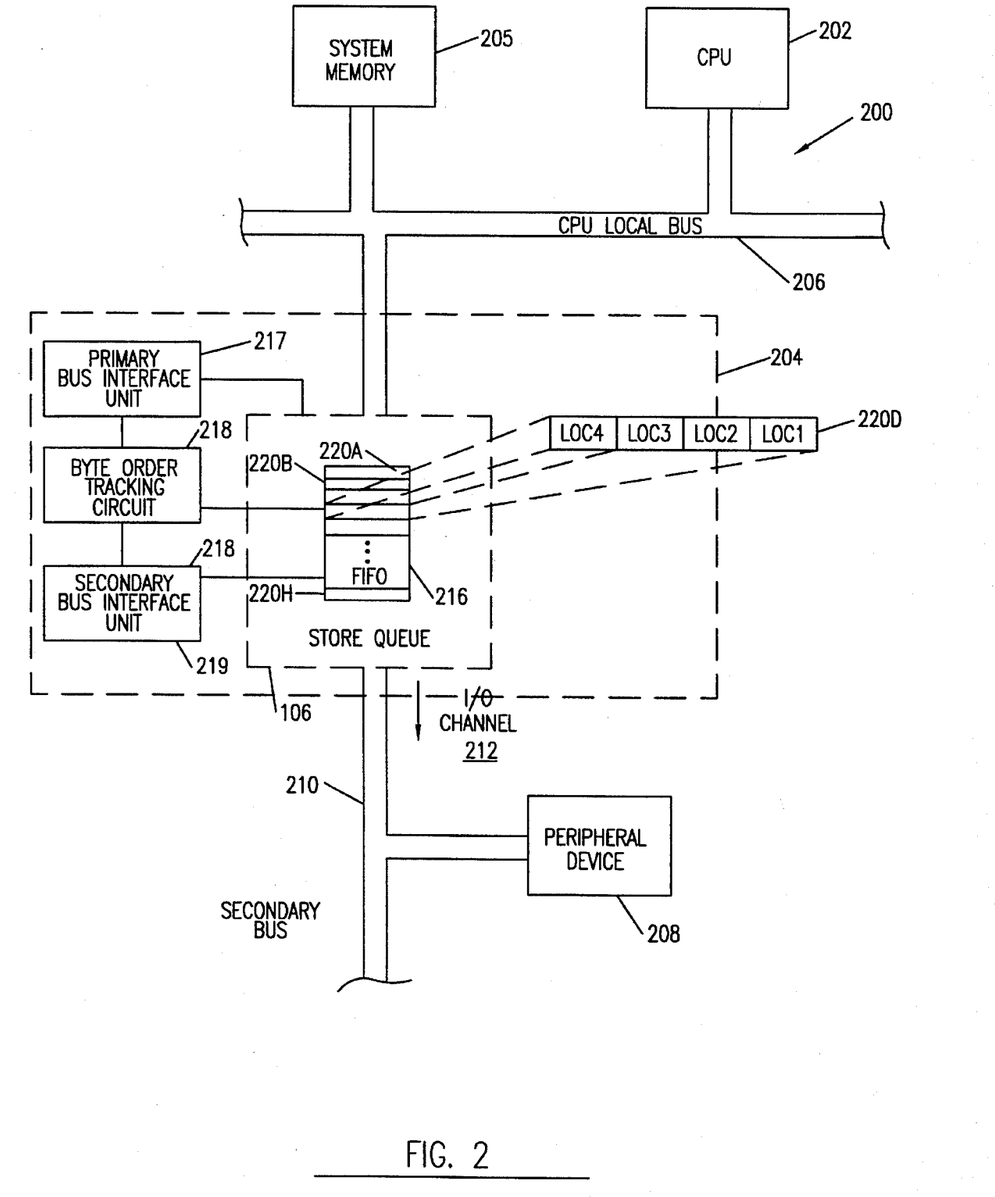
FIG. 2 is a block diagram of an exemplary computer system including a store queue in accordance with the present invention.

Referring next to FIG. 2, a block diagram is shown of an exemplary computer system 200 to which the present invention may be adapted. Computer system 200 includes a microprocessor (CPU) 202 coupled to a store queue 204 and a system memory 205 via a CPU local bus 206. Store queue 204 is further coupled to a peripheral device 208 via a secondary bus 210.

In its simplified form as illustrated in FIG. 2, store queue 204 includes a FIFO buffer 216 coupled to a primary bus interface unit 217, a byte order tracking circuit 218, and a secondary bus interface unit 219. FIFO buffer 216 is arranged with a plurality of separately addressable word storage cells 220A–220H. It is noted that various circuit portions comprising store queue 204 have been omitted from the block diagram of FIG. 2 for simplicity and clarity. Specific details regarding one implementation of store queue 204 will be described in conjunction with FIGS. 3–7.

Generally speaking, store queue 204 provides an interface between microprocessor 202 and an I/O channel 212 formed by secondary bus 210 and peripheral device 208. Store queue 204 allows data transferred during consecutive partial writes of a given word address to be stored within a common word storage cell 220A–220H of FIFO buffer 216, regardless of whether the partial writes result in an invalid byte combination. The byte order tracking circuit 218 is provided for keeping track of the order of bytes written by microprocessor 202 during the consecutive partial writes. When the data is ready to be transferred to peripheral device 208, and if the data contained by the particular word storage cell does not constitute an invalid byte combination, the secondary bus interface unit 219 executes a single I/O write cycle on secondary bus 210. On the other hand, if the data contained by the word memory cell constitutes an invalid byte combination, the store queue 204 performs two or more partial writes on secondary bus 210 to transfer the data in the order it was received.

For instance, if microprocessor 202 executes a partial write to the lower order byte of a particular word address, the byte will be stored within a location Loc1 of a designated word memory cell, such as word memory cell 220D. If the microprocessor 202 subsequently executes a partial write to transfer a byte of data corresponding to the third order byte of the word address, than byte is allowed to be stored within the location Loc3 of word memory cell 220D. The byte order tracking circuit 218 identifies the byte within location Loc3 as being written after the byte within location Loc1. It is noted that store queue 204 allows this "non-contiguous" storage of bytes within a common memory cell 220D even though the byte combination taken alone is invalid for system bus transfers. When store queue 204 subsequently is ready to transfer the bytes within memory word cell 220D, the secondary bus interface unit 219 uses the order information provided by byte order tracking circuit 218 to determine the proper order for transferring the bytes to peripheral device 210. For the specific situation as described above, the secondary bus interface unit 219 first executes a partial write cycle on secondary bus 210 no write the byte located within location Loc1 of word memory cell 220D and subsequently executes a second partial write cycle to write the byte within location Loc3 of word memory cell 220D. By allowing the storage of the non-contiguous bytes of data within the locations Loc1 and Loc3 of word memory cell 220D, the effective length of the store queue 204 is increased. In addition, if microprocessor 202 executes a third and a fourth partial write cycle to write the second order byte and the highest order byte of the addressed word consecutively after writing the first two bytes, all four bytes of data are stored within the respective locations of word memory cell 220D. The resulting data within word memory cell 220D thus no longer contains an invalid byte combination, and a single write cycle may be executed by secondary bus interface unit 219 on secondary bus 210 to transfer the entire word of data to peripheral device 208.

As will also be explained in greater detail below, store queue 204 is also capable of receiving a descriptor from microprocessor 202 to configure the store queue such that certain address regions are order-protected. Thus, if the data stored within store queue 204 corresponds to an address within the protected range, the store queue 204 is controlled to transfer the data on secondary bus 310 in the same order as it was written by microprocessor 302 rather than combining the partial writes. As a result, data coherency problems are avoided for situations in which proper processing of the data by peripheral device 208 is dependent upon the order of the bytes written from microprocessor 202.

Figure 3:
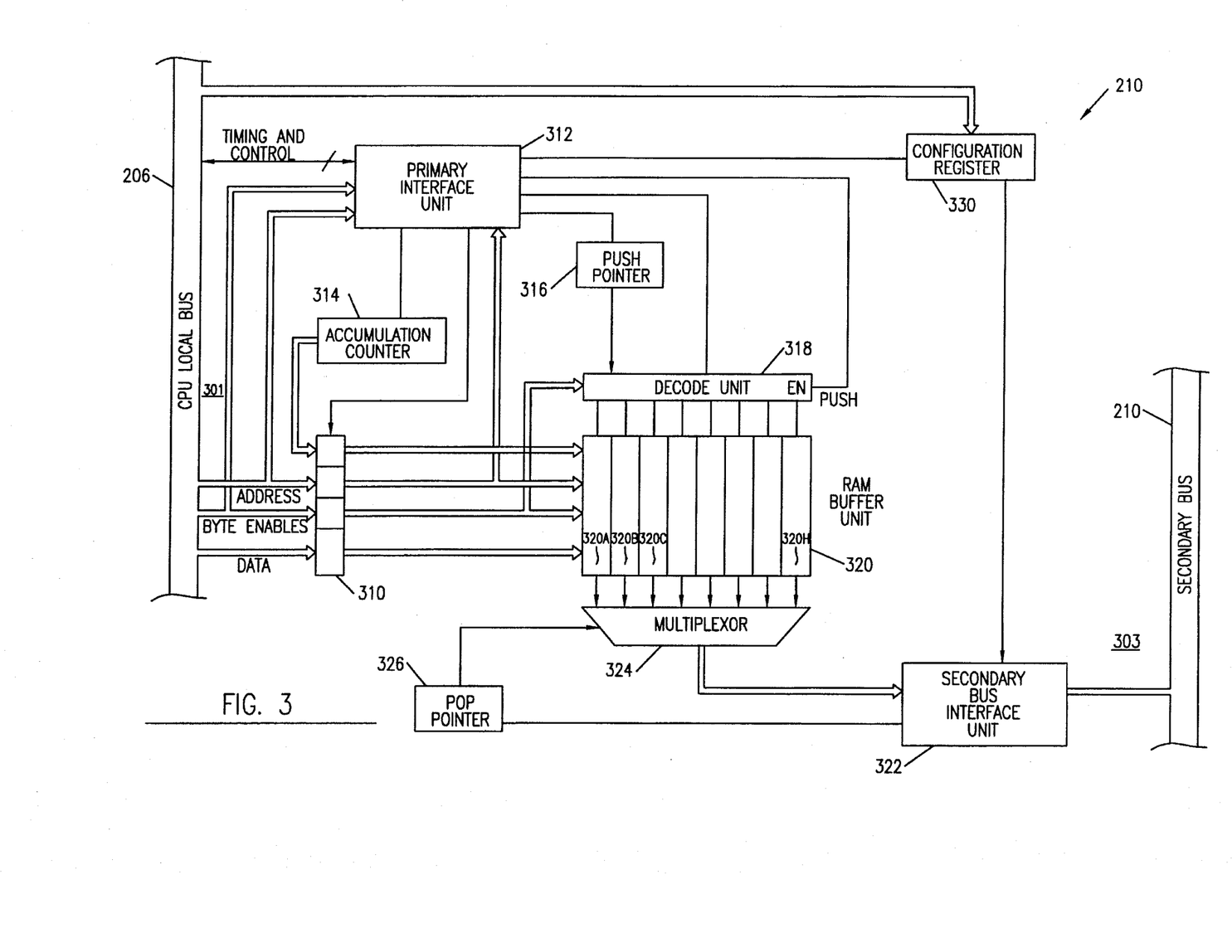
FIG. 3 is a block diagram that illustrates the store queue of FIG. 2 in greater detail.

FIG. 3 is a block diagram that illustrates one embodiment of store queue 204 in greater detail. In its illustrated form, store queue 204 includes a first port 301 coupled to CPU local bus 206, and a second port 303 coupled to secondary bus 210. A temporary buffer 310 and a primary bus interface unit 312 are coupled to CPU local bus 206, and an accumulation counter 314 and a push pointer 316 are coupled to primary bus interface unit 312. A decode unit 318 is coupled to push pointer 316, and a RAM buffer unit 320 is coupled to decode unit 318. A secondary bus interface unit 322 is coupled to secondary bus 210, and a multiplexer 324 as well as a pop pointer 326 are coupled to secondary bus interface unit 322. A configuration register 330 is finally shown coupled to secondary bus interface unit 322.

For the embodiment of FIG. 3, CPU local bus 206 includes a data bus having a width of 32-bits, an address bus having a width of 30-bits, and four byte enable lines. A "byte" of data as referred to herein constitutes 8-bits of data, and a "word" of data constitutes a total of four bytes. (Note that in some systems, this is referred to as a "Doubleword"). Secondary bus 304 includes the same number of data, address, and byte enable lines. It is understood, however, that the specific number of data, address, and byte enable lines may vary from system to system, and that the CPU local bus 206 and the secondary bus 210 may not necessarily have the same number of data, address, and byte enable lines. It is further understood that varying byte sizes or word sizes could be defined within an alternative system.

RAM buffer unit 320 is an SRAM memory including eight separately addressable storage regions 320A–320H. Each of the storage regions 320A–320H is capable of storing 74-bits of information. Data corresponding to different word addresses is provided to and from RAM buffer unit 320 on a first-in, first-out basis. As such, RAM buffer 320 forms a FIFO type buffer. An input port of RAM buffer unit 320 is coupled to an output port of temporary buffer 310, and an output of each storage region 320A–320H is coupled to separate input channels of multiplexer 324.

When a write cycle is executed on CPU local bus 206 by, for example, microprocessor 202 (of FIG. 2), information relating to the write cycle is latched into temporary buffer 310 if the write cycle is directed to the I/O channel to which secondary bus 210 corresponds. Generally speaking, the write data as well as the corresponding word address and byte enable signals are transferred from CPU local bus 206 into temporary buffer 310, into RAM buffer unit 320, through multiplexer 324, and to secondary bus 210 via secondary bus interface unit 322. As was described in general terms with reference to FIG. 2, the store queue 204 merges consecutive partial writes to the same word address into a common storage region of RAM buffer unit 320. Accumulation counter 314, which is under the control of primary bus interface unit 312, forms a byte order tracking circuit for generating count information indicative of the order of the partial writes. Rather than inhibiting the merging of consecutive partial writes which together would form an invalid byte combination, the bytes are merged within a common storage region of RAM buffer unit 320. When the data is transferred to secondary bus 304, if an invalid byte combination exists or if the address of the data is within an order-protected range, the secondary bus interface unit 322 duplicates the original order of the writes according the stored order information. Further details follow.

Upon reset of a computer system 300, the push pointer 316 and pop pointer 326 are reset to an initial value (i.e., such as zero). Push pointer 316 is a 3-bit binary counter circuit that sequentially counts from a value of zero up to a value of seven and then resets back to a value of zero. The count value of push pointer 316 controls the particular storage region 320A–320H of RAM buffer unit 320 into which the contents of temporary buffer 310 are stored. Push pointer 316 increments in response to a control signal from primary bus interface unit 312. Pop pointer 326 is also a 3-bit binary counter circuit that controls which one of the outputs of storage regions 320A–320H of RAM buffer unit 320 are coupled to secondary bus interface unit 322 via multiplexer 324. Pop pointer 326 increments in response to a control signal from secondary bus interface unit 322.

When a write cycle is executed on CPU local bus 302 by microprocessor 202, the address, byte enable, and data signals are latched into temporary buffer 310 if the write is directed to the I/O channel formed by secondary bus 304. At this point, accumulation counter 314 drives a value into temporary buffer 310 indicating that this is the first write of the particular word address (as indicated by the address lines of CPU local bus 206). After the address, byte enables, and data have been latched into temporary buffer 310, primary bus interface unit 312 returns a ready signal to local bus 302, thereby indicating that it has accepted the data.

Figure 4:
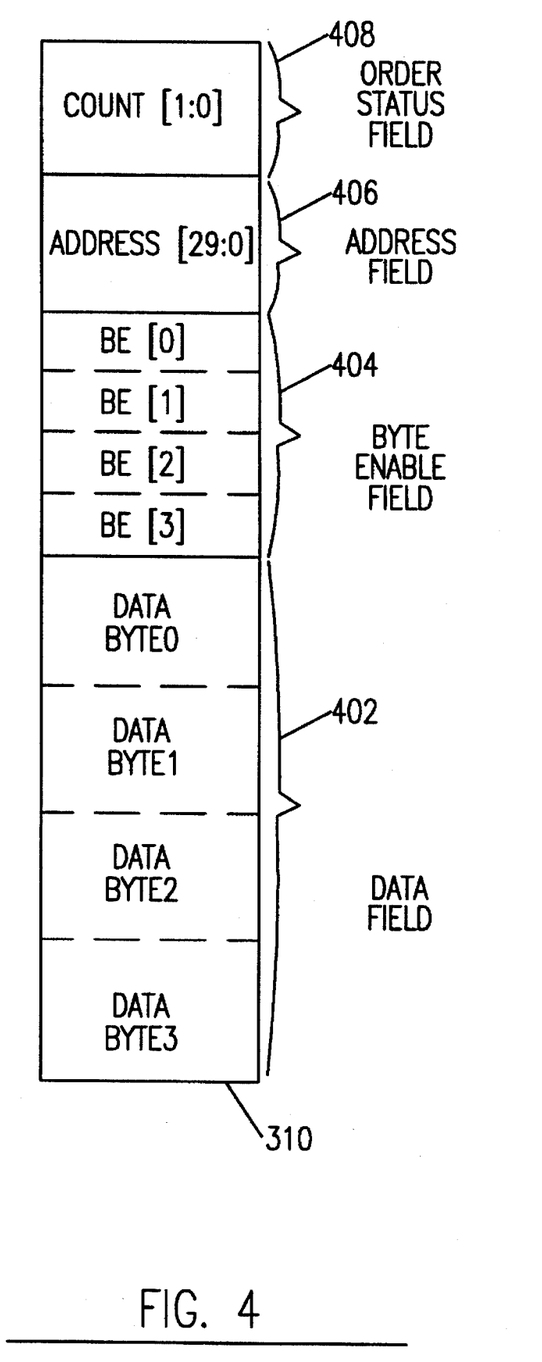
FIG. 4 is a diagram that illustrates the format of information stored within a temporary buffer of the store queue of FIG. 3.

The format of the information stored within temporary buffer 310 is illustrated in FIG. 4. The information provided to temporary buffer 310 is stored in several separate regions referred to as a data field 402, a byte enable field 404, an address field 406, and an order status field 408. Referring collectively to FIGS. 3 and 4, upon execution of a write cycle on CPU local bus 206, the write data is stored within data field 402, the byte enable signals are stored within byte enable field 404, and the address signal is stored within address field 406. The data field 402 is a 32-bit field, byte enable field 404 is a 4-bit field, and address field 406 is a 30-bit field. Ordering information from accumulation counter 314 is further stored within order status field 408. Specifically, the order status field 408 is a 2-bit field for storing the count value for the particular write cycle as generated by accumulation counter 314. A new count value may be stored within the order status field 408 each time new information is latched into temporary buffer 310. The count value itself is dependent upon the current status of accumulation counter 314 as well as upon whether the immediately preceding information stored within temporary buffer 310 was also associated with the same word address.

Therefore, upon a write of data for a particular address, whether it be a partial write or a full word write, the count value of accumulation counter 314 is reset to a binary value of zero if the immediately preceding cycle did not correspond to the same address. Once the address, byte enable, and data signals, along with the count value, have been latched within temporary buffer 310, the information is transferred into the particular storage region 320A–320H to which push pointer 316 points. For example, upon reset when push pointer 316 has a value of zero, it points to storage region 320A. After the address, byte enable, and data information have been stored within temporary buffer 310, the primary bus interface unit 312 asserts a signal labelled "push" that causes decode unit 318 to generate a set of enable signals to store the information within the designated storage region 320A. This will be examined in greater detail below.

Figure 5:
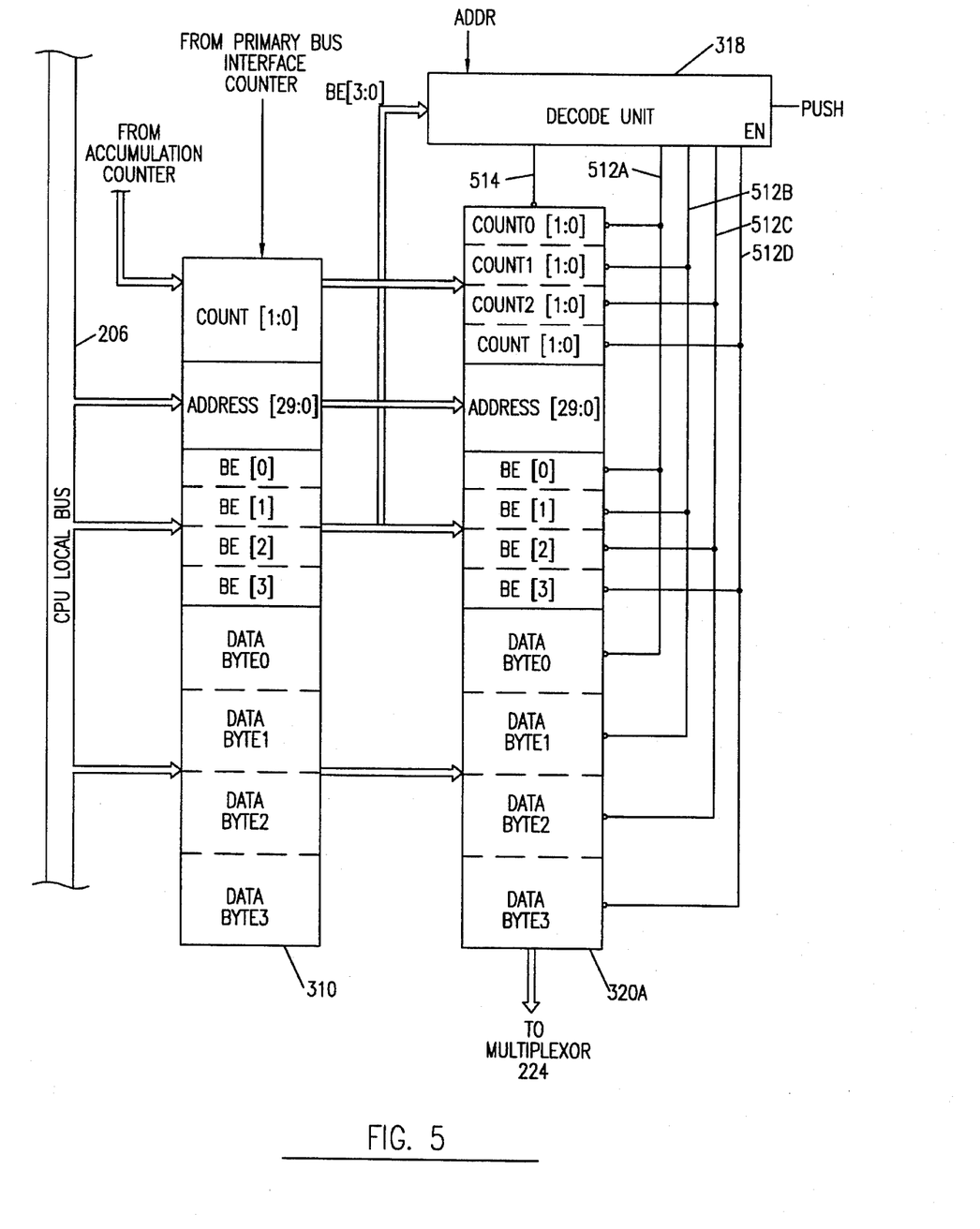
FIG. 5 is a block diagram that illustrates a portion of the store queue of FIG. 3.

FIG. 5 is a block diagram that illustrates a portion of store queue 204. FIG. 5 is provided to illustrate the transfer of information from temporary buffer 310 into the storage region 320A of RAM buffer unit 320, as well as to illustrate the merging of data within RAM buffer unit 320.

The format of information as stored within storage region 320A of RAM buffer unit 320 is similar to that of the information stored within temporary buffer 310. However, a count field of storage region 320A comprises four 2-bit values labelled Count0–Count3. As will be explained in greater detail below, depending upon various control signals provided from decode unit 318, any one or more of the count values Count0–Count3 may receive and store the count value (Count[1:0]) within temporary buffer 310. It is further noted that the remaining storage regions 320B–320H of RAM buffer unit 320 are configured similarly. Each storage region 320A–320H is referred to as a word memory cell in that each is capable of storing a complete word of data and is separately addressable by decode unit 318.

Referring collectively to FIGS. 3 and 5, after the data, byte enable, address, and count value signals for a particular transfer have been stored within temporary buffer 310, primary bus interface unit 312 asserts the push signal to enable decode unit 318. Decode unit 318 responsively asserts one or more enable signals at lines 512A–512D to selectively enable certain portions of storage region 320A. Decode unit 318 additionally asserts a signal at line 514 that causes selected data from temporary buffer 310 to be latched into storage region 320A. In this embodiment, the enable signals at lines 512A–512D are derived directly from the byte enable signals BE[3:0] stored within temporary buffer 310. As a consequence, if all the byte enable signals BE[3:0] are asserted, all of the information comprising each field of temporary buffer 310 is stored within storage region 320A. In addition, the count values Count0–Count3 of storage region 320A receive the count value Count[1:0] of temporary buffer 310. If on the other hand, for example, only the byte enable signal BE[0] is asserted, the decode unit 318 asserts a signal at line 512A and keeps the signals at lines 512B–512D deasserted. As a consequence, only the Count0, the BE[0], and data Byte0 portions of memory region 320A are enabled. When decode unit 318 subsequently (or simultaneously) asserts the latching signal at line 514, the count value within temporary buffer 310 is stored within the Count0 portion of storage region 320A. In addition, the address signal, the BE[0] signal, and the data Byte0 values are also transferred into the appropriate locations of storage region 320A.

After the information corresponding to the first write cycle has been latched into temporary buffer 310 and the ready signal has been asserted by primary bus interface unit 312, the microprocessor 202 may execute another write cycle. When a subsequent write cycle is executed by the microprocessor, the new word address signal on local bus 302 is compared to the previous word address stored within the address field of temporary buffer 310. This comparison is performed by primary bus interface unit 312. If the word addresses are not the same, the primary bus interface unit 312 causes the push pointer 316 to increment. Thereafter, the address, byte enable, and data information from CPU local bus 206 is latched within temporary buffer 310. Since the primary bus interface unit 312 indicates that this word address is not the same word address as the previous cycle, accumulation counter 314 again drives the count field count value ( i. e., Count [1:0]) of temporary buffer 310 with a binary value of "00". The contents of temporary buffer 310 are then loaded into storage region 320B of RAM buffer unit 320 in a manner similar to that described above. It is noted that storage region 320B is loaded with this new information since push pointer 316 was incremented.

If the word address of the subsequent write cycle executed on CPU local bus 302 is instead the same word address as the previous write cycle (as stored within temporary buffer 310), the primary bus interface unit 312 does not cause the push pointer 316 to be incremented. Instead, accumulation counter 314 generates a count value of "01" which is provided to the input of the count field of temporary buffer 310. The primary bus interface unit 312 then causes the address, byte enable, data and count value to be latched within temporary buffer 310. Thereafter, the primary bus interface unit 312 causes the information to be merged with the previously stored information within storage region 320A. The merging of the information corresponding to this subsequent write cycle into the information already stored within storage region 320A is accomplished by again qualifying the latching of information into storage region 320A in accordance with the byte enable signals of the current transfer. This will be understood from the following.

Consider the situation described previously in which a first write cycle executed on CPU local bus 302 is initiated by the microprocessor to transfer the lower byte (i.e., Byte0) of a particular word to the I/O channel of secondary bus 210. When this cycle is executed, the signals on the address lines, the byte enable lines, and the data lines of CPU local bus 302 are latched into temporary buffer 310 by local interface unit 312. In addition, the accumulation counter 314 drives the count field of temporary buffer 310 with a binary value of "00". Subsequently, when primary bus interface unit 312 causes the data to be transferred into storage region 320A of RAM buffer unit 312, the decode unit 318 enables only those portions of storage region 320A corresponding to valid information. Thus, since the byte enable field of the information within temporary buffer 310 indicates that only data Byte0 is valid (since the byte enable signal BE[0] is low while the byte enable signals BE[3:1] are high), decode unit 318 drives line 512A low while driving lines 512B–512D high. When a latching signal at line 514 is subsequently (or simultaneously) asserted, only the enabled portions of storage region 320A receive corresponding information from temporary buffer 310. For this specific example, a binary value of "00" is loaded into the Count0 field of storage region 320A, the address signal [29:0] is loaded into the address field, the byte enable signal BE[0] is loaded into the byte enable field, and the data Byte0 is loaded into the data field of storage region 320A.

As stated previously, if the next consecutive write cycle corresponds the same address value as the preceding cycle, the push pointer 316 is not incremented and the accumulation counter 314 drives a count value of "01" to the order field of temporary buffer 310. For example, if the next write cycle executed on CPU local bus 302 is initiated to write the next byte (i. e., bate) of the particular word, the address, byte enable, and data signals of CPU local bus 306 are again latched into temporary buffer 310, along with the count value. For this cycle, however, the BE[1] signal will be asserted low, and valid data will be contained within the Data Byte1 portion of the data field of temporary buffer 310. Subsequently, this new information is merged into the previous information of storage region 320A by again providing the byte enable signals to decode unit 318. During this transfer, however, the line 512B will be asserted low by decode unit 318. Therefore, the count value of "01" will be stored within the Count1 field of storage region 320A, along with the address signal, the byte enable signal BE[1] and the data Byte1. Additional partial writes on CPU local bus 206 to the same word address (i.e., such as the writes of the third order byte and the highest order byte) may be merged similarly, with the count value of the accumulation counter 314 incrementing sequentially from "01" to "10" and finally to "11" upon each successive partial write.

It is noted that if two bytes are being written during a particular cycle on CPU local bus 302, two of the byte enable signals BE[3:0] will be driven low. This will responsively cause decode unit 318 to assert two of the signals at lines 512A–512D low, thus allowing two of the data bytes of temporary register 310 to be transferred into storage region 320A. Write cycles of three or four bytes to a particular word address are treated similarly.

It is furthermore noted that consecutive write cycles on CPU local bus 302 to non-contiguous bytes of a particular address still result in the merging of the bytes into the same storage region. For example, if a first write cycle on CPU local bus 306 results in the writing of the lower byte of data Byte0, and an immediately following write cycle results in the write of the third-order data byte Byte2 of that word, these bytes are merged into a common storage region (i.e., storage region 320A) of RAM buffer unit 320 in the manner described previously. If the next write cycle has a different word address, the push pointer is incremented. As a result, even though the consecutive write cycles result in an invalid byte combination stored within storage region 320A, the allocation of a second storage region of RAM buffer unit 320 to accommodate the storage of the data Byte2 is unnecessary. Thus, an additional storage region of RAM buffer unit 320 is available for storing other data. Furthermore, if the next consecutive write cycle on CPU local bus is a write to the second-order data Byte1 of the particular word, the invalid byte combination no longer exists. Thus, a single write cycle may be executed to transfer the data to secondary bus 210. If an invalid byte combination is present within a particular storage region of RAM buffer unit 320 when the data is to be transferred to the I/O channel via secondary bus 210, the secondary bus interface unit 322 parses the information contained within the storage region according to the count values Count0–Count3. This will be explained in detail below.

After valid data has been stored within RAM buffer unit 320, secondary bus interface unit 322 initiates and orchestrates the execution of one or more write cycles on secondary bus 304 to transfer the data temporarily stored by RAM buffet unit 320. It is noted that secondary bus interface unit 322 may wait some predetermined time-out period before initiating a cycle to transfer data within a particular memory cell to allow subsequent partial write cycles to be merged into that memory cell. Consider the situation in which valid data has been stored within storage region 320A of RAM buffer unit 320. This information is channeled through multiplexer 324 to secondary bus interface unit 322 in accordance with the value of pop pointer 326. If the byte enable combination indicated by the byte enable signals for that word is not invalid and if the word address is not within an order-protected range (as described in greater detail below), secondary bus interface unit 322 executes a single write cycle to transfer the data on secondary bus 304. On the other hand, if an invalid byte combination exists, secondary bus interface unit 322 parses the information within storage region 320A into separate partial write cycles on secondary bus 304. The order in which these partial write cycles are executed depends upon the order information as indicated by the count values Count0–Count3. For example, consider a situation in which the byte enable signals BE[0] and BE[2] are set within storage region 320A. If the Count0 value is less than the Count2 value (i.e., Count 0="00" and Count2="01"), the secondary bus interface unit 322 executes a first partial cycle to write the data Byte0 on secondary bus 210 and subsequently executes a second partial write cycle to write the data Byte2 on secondary bus 210. This order of execution would be reversed if the Count2 value was less than the Count0 value.

For situations in which an invalid byte combination exists, and three bytes of valid data are contained by a particular storage region, the secondary bus interface unit 322 may be alternatively configured to execute two partial write cycles on secondary bus 210 even though the three bytes of data within the storage region may have been written during three separate partial write cycles on CPU local bus 206. For example, consider a situation in which data Byte0 is written during a first partial write cycle on CPU local bus 206, data Byte1 is written during a second partial write cycle on CPU local bus 206, and data Byte3 is written during a third partial write cycle on CPU local bus 206. Since data Byte2 was not written during these consecutive writes, a non-continuity exists within the byte enable signals stored by the storage region 320A of RAM buffer unit 320. Secondary bus interface unit 322 may transfer this data on secondary bus 210 by executing a first write cycle to write both Byte0 and Byte1 during a first partial write cycle, and subsequently to write the data Byte3 during a second partial write cycle on secondary bus 210.

The store queue 204 of FIG. 3 is further provided with a configuration register 330 that may be software written by the system programmer. Configuration register 330 is provided for storing a value indicative of a range of address locations that are order-protected. When secondary bus interface unit 322 receives a new word address corresponding to data within a particular storage region of RAM buffer unit 320, the secondary bus interface unit 322 determines whether the word address is within the protected range specified by configuration register 330. If the word address is within the protected range, the secondary bus interface unit 322 transfers the data to secondary bus 210 in the exact order it was received from CPU local bus 206. It is noted that this order is indicated by the count values Count0–Count3. As a result of the incorporation of configuration register 330 within store queue 204, the system programmer is allowed to order-protect selected address regions to ensure that data received on CPU local bus 206 is transferred in the same order on a per-bit basis when the data is transferred on secondary bus 210. As a result, data coherency problems may be avoided for situations in which proper processing of the data by a receiving peripheral device is dependent upon the order of the bytes written from the microprocessor.

Figure 6:
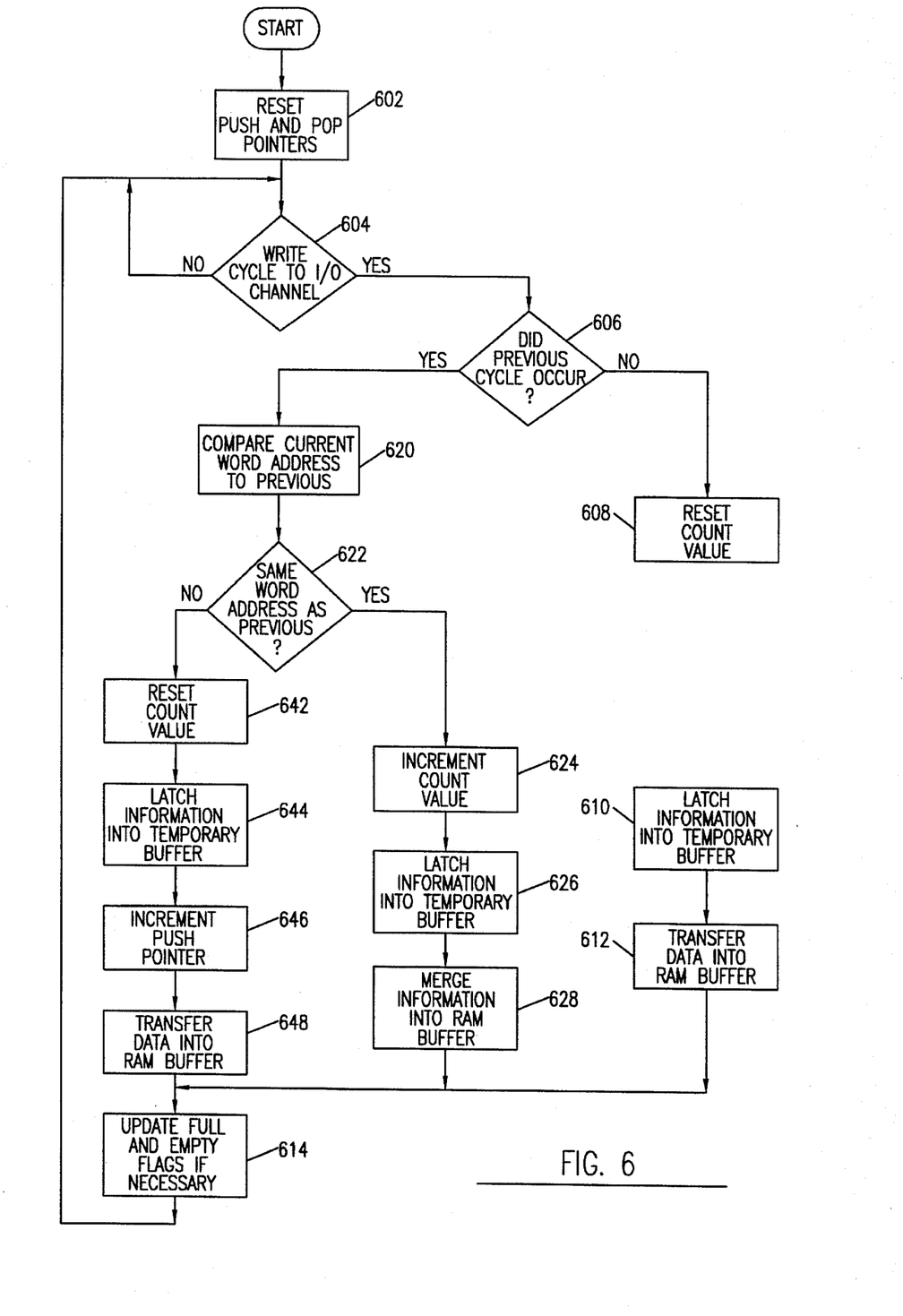
FIG. 6 is a flow diagram that illustrates operation of a primary bus interface unit of FIG. 3.
Figure 7:
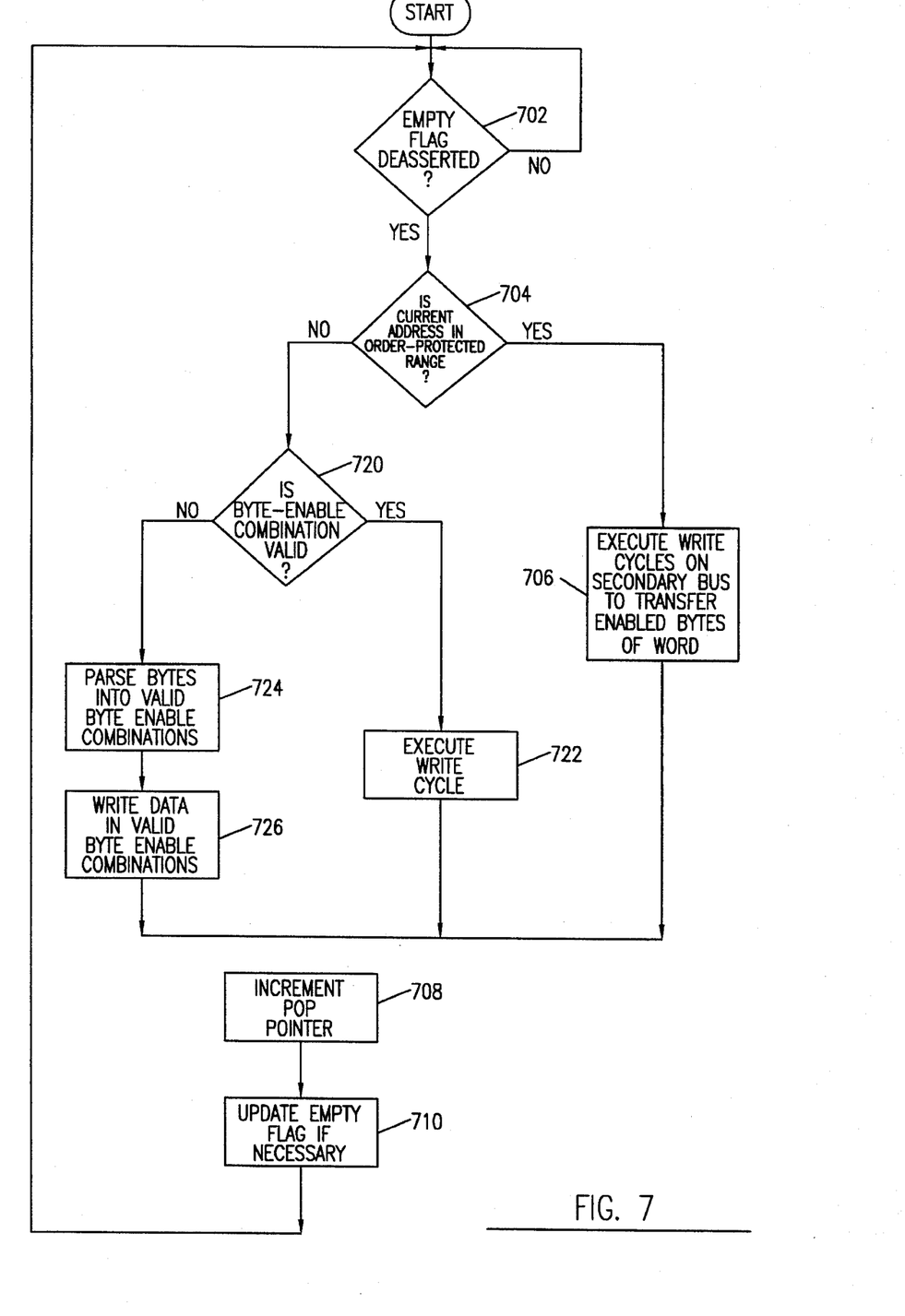
FIG. 7 is a flow diagram that illustrates operation of a secondary bus interface unit of FIG. 3.

FIGS. 6 and 7 are flow diagrams that illustrate the operation of primary bus interface unit 312 and secondary bus interface unit 322, respectively. Referring first to FIG. 6, the primary bus interface unit 312 initially resets the push pointer 316 and the pop pointer 326 during step 602. The primary bus interface unit 312 next monitors the CPU local bus 206 during step 604 to determine whether a write cycle to the I/O channel formed by secondary bus 210 is executing. If such a write cycle is executing, the primary bus interface unit 312 determines during step 606 whether a previous cycle to the I/O channel occurred. If no previous write cycle occurred, the primary bus interface unit 312 causes accumulation counter 314 to reset and to thus drive the count value with a binary value of "00" during step 608, subsequently the primary bus interface unit causes the data, address, byte enable, and count value signals to be latched into temporary register 310 during step 610. Primary bus interface unit 312 then asserts the Push signal to cause the information to be transferred into a designated storage region of RAM buffer unit 320 during step 612. The primary bus interface unit 312 then updates an empty flag and a full flag associated with the store queue if appropriate during step 614, and waits for additional write cycles to occur during step 604. It is noted that the empty flag and the full flag are generated by appropriate circuitry within the store queue to indicate whether the queue is currently empty or full. Such circuitry is well-known.

If a subsequent write cycle to the I/O channel occurs, the primary bus interface unit 312 compares the current word address on CPU local bus 206 to the previous word address stored within temporary buffer 310. This occurs during step 620. If the current word address is the same as the previous word address, as determined during step 622, the value of accumulation counter 314 is incremented during step 624, and the data, address, byte enable, and count value signals are latched within temporary buffer 310 during step 626. The primary bus interface unit 312 thereafter asserts the Push signal during step 628 to merge the new information into the previously stored information. The full and empty flags are then updated, if necessary. The primary bus interface unit 312 again reverts back to step 604 to wait for additional write cycles to the I/O channel.

If the current word address is different from the previous address as determined during step 622, the accumulation counter 314 is reset during step 642 and therefore drives a value of "00" to temporary buffer 310. The primary bus interface unit 312 then causes the data, address, byte enable, and count value signals to be latched into temporary buffer 310 during step 644, and causes the value of push pointer 316 to increment during step 646. If the full flag is not asserted, the primary bus interface unit 312 causes the data within temporary buffer 310 to be transferred into the designated storage region of RAM buffer unit 320 during step 648. The empty flag and the full flag is again updated during step 614, if appropriate.

Referring next to FIG. 7, the secondary bus interface unit 322 remains idle while the empty flag is deasserted, as determined during step 702. After valid data has been stored within RAM buffer unit 320 (and following a predetermined time-out period), the secondary bus interface unit 322 determines whether the current word address provided from one of the storage regions through multiplexer 324 is within the order-protected range specified by configuration register 330. If the current word address is within the order-protected range, the secondary bus interface unit 322 executes one or more write cycles on secondary bus to transfer the enabled bytes of the word in the order indicated by the stored count values. This occurs during step 706. The pop pointer 326 is thereafter incremented during step 708, and the empty and full flags are updated during step 710, if appropriate.

If the current word address provided to secondary bus interface unit 322 is not within an order-protected range, the secondary bus interface unit 322 determines whether the byte enable combination of the word is valid during step 720. If the byte enable combination is valid, a single write cycle is executed during step 722 to transfer the data via secondary bus 210. The pop pointer 326 is again incremented during step 708, and the empty flag is updated if necessary during step 710. If the byte enable combination is invalid, as determined during step 720, the secondary bus interface unit 322 parses the bytes into valid byte combinations during step 724. During step 726, an appropriate number of consecutive partial write cycles are executed by secondary bus interface unit 322 to transfer the parsed valid byte combinations via secondary bus 210. The value of pop pointer 326 is again incremented during step 708, and the empty and full flags are updated if necessary during step 710.

It is noted that the primary bus interface unit 312 and the secondary bus interface unit 322 may be reduced to sequential logic circuitry using computer-aided tools such as the behavioral language Verilog as well as the VHSIC hardware description language.

While the details of the store queue 204 described above focus upon the transfer of data from the CPU local bus 206 to the secondary bus 210, additional circuitry may be employed within the store queue to accommodate, for example, read cycles executed by the microprocessor to transfer data from secondary bus 210 to CPU local bus 206. The store queue may implement bus snooping techniques to maintain data coherency during such situations, or may be implemented such that the write data within RAM buffer unit 320 must be completely unloaded before the execution of a read cycle is allowed. Various circuits for implementing such techniques are well-known.

Numerous variations and modifications will become apparent to those skilled in the art once the above disclosure is fully appreciated. For example, it is noted that while the embodiment described above in conjunction with FIG. 3 utilizes a counter circuit (accumulation counter 314) to generate count values for keeping track of the order of the bytes received from CPU local bus 206, a variety of other circuits and techniques may be employed to implement a byte order tracking circuit that keeps track of the order of the bytes written from CPU local bus 206. It is additionally noted that while RAM buffer unit 320 is configured as a FIFO buffer for the embodiment of FIG. 3, other types of storage mechanisms could be employed. It is finally noted that while each storage region of RAM buffer unit 320 stores both a full word of data as well as address, byte enable, and count information associated with that word, an alternative configuration is possible wherein the address, byte enable, and count information is stored separately from the data. It is intended that the following claims be interpreted to embrace all such variations and modifications.

What is claimed is:

1. A store queue for temporarily storing data to be transferred from a primary bus to a secondary bus, said store queue comprising:

a storage unit including a plurality of word storage cells, wherein one of said word storage cells receives a first group of data in response to a first partial write cycle on said primary bus;

a primary bus interface unit coupled to said storage unit and said primary bus, wherein said primary bus interface unit determines whether a subsequent partial write cycle on said primary bus corresponds to a word address of said first partial write cycle, and wherein said primary bus interface unit causes a merging of a second byte of data associated with said subsequent partial write cycle into said one of said word storage cells if said subsequent partial write cycle corresponds to said word address of said first partial write cycle;

a byte order tracking circuit coupled to said storage unit and for tracking the order in which said first byte is written with respect to said second byte; and a secondary bus interface unit coupled to said storage unit and for transferring said first and second bytes of data from said one of said word storage cells of said storage unit during separate partial write cycles on said secondary bus.

2. The store queue as recited in claim 1 wherein said secondary bus interface unit transfers said first and second bytes of data during separate partial write cycles on said secondary bus in an order controlled by said byte order tracking circuit.

3. The store queue as recited in claim 1 wherein said secondary bus interface unit executes single write cycle on said secondary bus if said first and second bytes of data from said one of said word storage cells constitutes a valid byte combination, and wherein said secondary bus unit transfers said first and second bytes of data from said one of said word storage cells during separate partial write cycles on said secondary bus if said first and second bytes of data constitute an invalid byte combination.

4. The store queue as recited in claim 1 further comprising a configuration register coupled to said secondary bus interface unit, wherein said configuration register stores a value indicative of an order-protected address range, and wherein said secondary bus interface unit of separately transfers said first and second bytes of data from said one of said word storage cells if said word address of said first partial write cycle is within said order-protected range.

5. The store queue as recited in claim 4 wherein said configuration register is written with data provided from said primary bus.

6. The store queue as recited in claim 1 wherein each of said plurality of word storage cells stores a complete word of data.

7. The store queue as recited in claim 6 wherein each of said plurality of word storage cells further stores an address value and a set of byte enable signals associated with said word of data.

8. The store queue as recited in claim 1 wherein said byte order tracking circuit includes a counter for generating a value indicative of an order of a current partial write cycle relative to a previous partial write cycle to a given word address.

9. The store queue as recited in claim 1 wherein said byte order tracking circuit includes a counter circuit for generating a first count value indicative of a transfer order said first byte of data and a second count value indicative of a transfer order of said second byte of data.

10. The store queue as recited in claim 9 wherein said first and second count values are stored within said storage unit, and are provided to said secondary bus interface unit with said first and second bytes of data.

11. The store queue as recited in claim 1 further comprising a temporary buffer coupled to said storage unit and to said primary bus for receiving write data from said primary bus.

12. The store queue as recited in claim 1 wherein said storage unit is configured as a FIFO buffer, and wherein said primary bus interface unit causes an address pointing to one of said plurality of word storage cells to increment if a previous write cycle on said primary bus is associated with a word address that is different from a word address of a consecutive write cycle on said primary bus.

13. The store queue as recited in claim 1 further comprising a multiplexer having a plurality of input channels coupled to respective outputs of said plurality of word storage cells, and wherein a select input of said multiplexer is controlled by a pop pointer.

14. A store queue for temporarily storing data to be transferred from a primary bus to a secondary bus, said store queue comprising:

a storage unit including a plurality of word storage cells, wherein one of said word storage cells capable of receiving a first byte of data in response to a first partial write cycle on said primary bus;

a primary bus interface unit coupled to said storage unit and said primary bus, wherein said primary bus interface unit determines whether a subsequent partial write cycle on said primary bus corresponds to a word address of said first partial write cycle, wherein said primary bus interface unit causes a merging of a second byte of data associated with said subsequent partial write cycle into said one of said word storage cells if said subsequent partial write cycle corresponds to said word address and wherein said primary bus interface unit causes said second byte of data to be stored in a separate word storage cell if a word address of said subsequent partial write cycle is not equal to said word address of said first partial write cycle;

an accumulation counter coupled to said storage unit and generates a count value indicative of the order in which said first byte was written relative to said second byte if said word address of said first partial write cycle equals said word address of said subsequent partial write cycle; and a secondary bus interface unit coupled to said storage unit and for transferring said first and second bytes of data from said one of said word storage cells of said storage unit during separate partial write cycles on said secondary bus in said order indicated by said count value.

15. The store queue as recited in claim 14 wherein said secondary bus interface unit executes a single write cycle on said secondary bus if said first and second bytes of data from said one of said word storage cells constitutes a valid byte combination, and wherein said secondary bus unit transfers said first and second bytes of data from said one of said word storage cells during separate partial write cycles on said secondary bus if said first and second bytes of data constitute an invalid byte combination.

16. The store queue as recited in claim 14 further comprising a configuration register coupled to said secondary bus interface unit, wherein said configuration register stores a value indicative of an order-protected address range, and wherein said secondary bus interface unit separately transfers said first and second bytes of data from said one of said word storage cells if said word address of said first partial write cycle is within said order-protected range.

17. A method for operating a store queue which provides an interface between a primary bus and a secondary bus, said method comprising the steps of:

receiving a first byte of data in response to a first partial write cycle on said primary bus;

receiving a second byte of data in response to a subsequent partial write cycle on said primary bus;

storing said first byte and said second byte of data within a common word storage cell;

tracking an order in which said first byte was received relative to said second byte;

determining whether said first byte and said second byte of data within said word storage cell constitutes an invalid byte combination; and transferring said first and second bytes of data during a single write cycle on said secondary bus if a valid byte combination exists and transferring said first byte and said second byte of data during separate partial write cycles on said secondary bus if an invalid byte combination exists.

18. The method as recited in claim 17 wherein said first byte of data and said second byte of data are written during said separate partial write cycles in an order corresponding to said order in which said first byte was received relative to said second byte.

19. The method as recited in claim 17 comprising the further steps of:

determining whether a word address corresponding to said first byte of data and said second byte of data is within an order-protected range; and transferring said first byte and said second byte of data on said secondary bus during separate partial write cycles if said address is within said order-protected range regardless of whether said valid byte combination exists.

20. The method as recited in claim 17 wherein said step tracking an order includes the step of generating a count value indicative of when said second byte was received relative to said first byte.

21. The method as recited in claim 17 comprising the further step of determining whether said first byte and said second byte of data are associated with the same word address.

* * * * *